May 5, 1931. C. J. GATES, JR., ET AL 1,803,696
LINER
Filed April 29, 1929
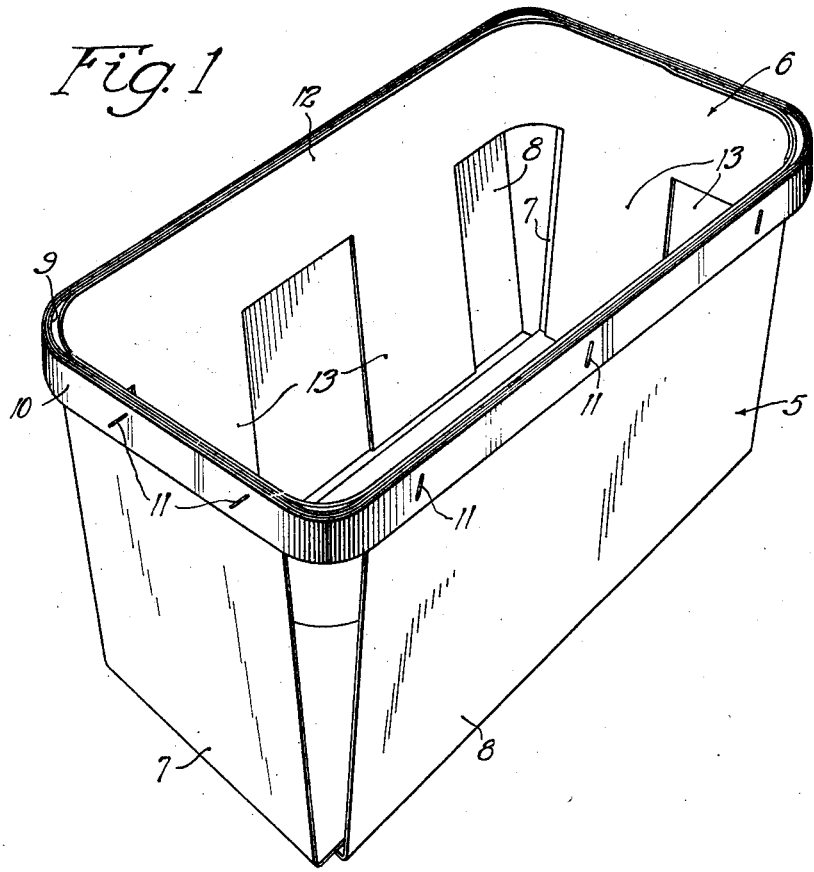
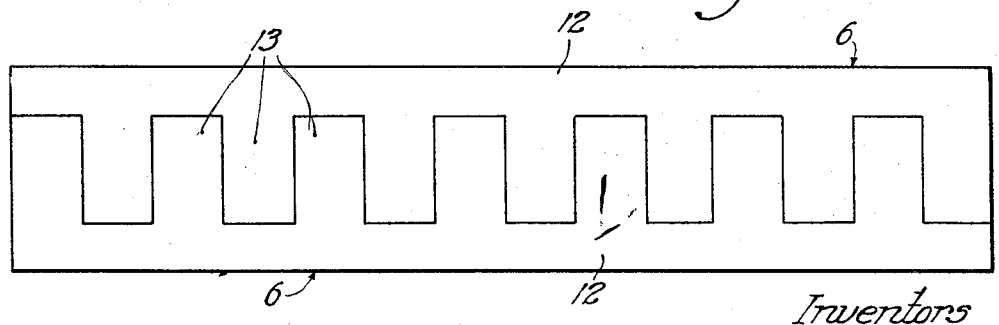
Inventors
C. J. Gates, Jr.
C. S. Nathan &
A. A. McDonough
By E. A. Wagonseller
Atty.

Patented May 5, 1931

1,803,696

UNITED STATES PATENT OFFICE

CLARENCE J. GATES, JR., CHARLES S. NATHAN, AND AMBROSE A. McDONOUGH, OF CHICAGO, ILLINOIS

LINER

Application filed April 29, 1929. Serial No. 358,776.

This invention relates to liners and more particularly to liners for use with containers such as veneer baskets which are used for packing fruits and vegetables. With the methods of handling vegetables and fruit heretofore employed, and more especially in the handling and packing of tomatoes, considerable difficulty has been experienced in providing a container cheap enough to satisfy the packer, who frequently operates on small margin of profit, and at the same time to afford adequate protection to the tomatoes so that the spoilage will be reduced to a minimum. In the case of tomatoes particularly, and more especially during winter months, the available supply comes from the southern part of the United States and from Mexico. These tomatoes are handled by unskilled labor and packed before they are completely ripe in cheaply made veneer baskets. While the baskets have sufficient strength to support their contents, they are frequently defective as regards stapling, that is, the staples which hold the box parts together are not carefully clinched so that many sharp points project toward the interior of the basket, and even where no sharp points are present, the staples often project sufficiently to present an edge which easily breaks the skin of the tomato when pressing thereagainst due to the vibration that occurs during transit in freight cars or trucks.

When a break occurs in the skin of a tomato, in nearly every instance, there will be a quantity of juice exude from the opening. This juice will run down the sides of the basket and partially saturate the veneer thus making a very fertile area for the growth of certain varieties of fungi which readily attack the undamaged tomatoes to their consequent spoilage or rotting. The growth of fungus on the basket walls often has a disagreeable odor and makes the whole basket unsightly, unsanitary and reduces its retail value. Baskets containing any amount of fungus growth must be discarded and destroyed as they are not generally fit for reuse.

The present invention has for its object the elimination of all of these disadvantageous features by the provision of a simple, inexpensive and effective liner for tomato baskets or baskets for other vegetables and fruit. This liner will, if desired, be waterproof so that it will not encourage the growth of fungus on its surface as in the case of the veneer walls alone. Therefore by the use of the present invention the baskets of tomatoes or other vegetables will be received in a clean, sweet, sanitary condition with spoilage reduced to a minimum and insuring that the baskets and contents will have a good retail sale value as choice produce. Furthermore the baskets may be reused to much better advantage due to the practical elimination of the growth of fungus thereon. Even if it should happen that the liner becomes covered with fungus the walls of the basket will be protected and the liner may be replaced by a fresh one and the basket repacked.

The use of liners also has a further advantage in insuring more effective insulation due to the double wall thus formed and also due to substantial areas of dead air spaces formed between the liner and basket wall. Another object is to provide a liner which can be readily assembled in a container, which requires no fastening means of any kind to hold it in place and which can be used without alteration with various sizes of baskets. A further object is to provide a liner which can be cut from a web of sheet material without waste and can be packed in bundles to take up a minimum amount of space in shipment and storage.

To these and other ends the invention resides in certain improvements and combinations of parts, all as will be hereinafter more fully described, the novel features being pointed out in the claims at the end of the specification.

In the drawings, illustrating a preferred embodiment of the present invention:

Fig. 1 is a perspective view of a fruit and vegetable container or basket with the improved liner assembled therein, and Fig. 2 is a plan view of two similar liners illustrating one manner in which they may be cut from a web of sheet material.

Similar reference numerals throughout the several views indicate the same parts.

The present embodiment of the invention provides a liner which is particularly advantageous for use with light, cheaply made fruit containers or baskets which are frequently put together by fastening means such as staples presenting sharp points or projections tending to damage the fruit or vegetables which are carried in the container unless the fruit is protected therefrom.

Referring more particularly to the drawings, there is shown at 5, in Fig. 1, a typical container with which the liner of the present invention may be used. This container, as shown, is in the usual form of a veneer basket for fruits and vegetables although the present liner is not limited in its use to any particular form of container. Within the basket 5 there is shown a liner 6 embodying the present invention. For the purpose of a full understanding of the invention the container 5 will be briefly described, although the particular construction of this container forms no part of the present invention. The container 5 comprises two pieces of suitable sheet material 7 and 8, such as wood veneer which are laid substantially at right angles to each other, each end thereof being bent upwardly to form the sides of the basket. In order to hold the sides of the basket in proper position there are provided suitable inner and outer strips designated at 9 and 10 which are secured in place by means of staples or other securing means 11, 11. The upwardly projecting ends of pieces 7 and 8 are flared outwardly beyond right angular relation to the portions forming the bottom of the basket thus providing openings at the corners which provide for a certain amount of ventilation of the contents of the basket.

As baskets of the type just described are made to sell very cheaply, it frequently happens that several, if not a majority, of the staples 11 have parts thereof projecting toward the interior of the basket and these parts or ends of the staples are frequently rough and jagged. Accordingly if a delicate skinned piece of fruit, such as a tomato or peach, is packed in the basket so as to lie against one of the projecting parts or jagged portions of the staples the skin thereof will generally be punctured with the result that the piece of fruit will "bleed" and considerable liquid will issue therefrom. This is especially true in the case of ripe fruits.

The exuded fruit juice from an injured piece of fruit is very susceptible to fermentation and when it runs down onto an underlying piece of fruit it will saturate a portion of its wrapper and remain in contact with the skin of any such fruit and it will be only the matter of a short time until fermentation begins. The fermentation of the juice thus coming in contact with the underlying fruit will soon cause it to begin to spoil or rot with the result that the entire contents of a basket will be frequently spoiled.

The liner of the present invention is designed for use with containers such as just described so as to reduce to a minimum all injury to fruit by reason of projecting staples, or equivalent securing means, as well as by reason of sharp corners formed by the inner strip of veneer which holds the walls of the basket in position. Furthermore, the present invention provides a liner which substantially increases the ventilation of the contents of the basket thus further decreasing the tendency of the fruit to rot. The liner 6, as shown herein may be made from any suitable sheet material, but, in the present instance, we prefer to make this liner of relatively thin fibre board so that it can be readily formed by die-cutting machinery. The liner 6 may be described as being essentially in the form of a strip 12 of sheet material disposed around the inside of the basket adjacent the top edge thereof and with one edge of the strip substantially flush with the top edge of the basket. The strip 12 when so placed will cover all projecting staples as well as any irregularities of the inner veneer strip 9 which might cause injury to the fruit.

The strip portion 12 may be held in place relatively to the top of the basket in any one of several different ways but, in the present instance, for this purpose, it is preferable to provide a plurality of spaced tabs or legs 13, 13 associated with the strip portion 12 and engaging at their lower ends the lower portion or bottom of the basket.

The width of the various tabs or legs may vary within certain limits and the spaces therebetween may also be other than uniform but, in the present embodiment, there is shown a liner formed with tabs or legs which are uniform in width and having the spaces between them substantially equal to the width of such tabs or legs.

It will be readily seen upon inspection of Fig. 2 that the liners of the present invention may be formed in an interengaging or dove-tailing arrangement, in which the tabs of one liner exactly fit into the spaces between the tabs of a complementary liner. Thus it will be readily observed that there will be no waste whatever of material in the manufacture of these liners. The liners are preferably cut from a continuous web of fibre board in which the grain of the material runs lengthwise of the web. In practice the web will be of a width exactly corresponding to the length of the liners which are to be cut out. This will eliminate all waste at the edges of the web. It is also preferable to cut the liners so as to be symmetrical but reversely disposed in pairs. That is, the liners will be cut from the web in pairs, as shown in Fig. 2, and one liner will terminate at one end even with the edge of a tab and at the other end it will terminate in a free strip portion and the other companion liner will be just the reverse, as shown.

The number of tabs or legs formed on the liner as well as the position of the tabs relatively to the basket sides will, in general, be immaterial. It is preferable, however, to have at least one tab or leg at each end and at least two at each side of the basket. The tabs are also preferably spaced so that when the liner is in position in a basket and closely engaging the walls thereof the tabs will be substantially symmetrically disposed relatively to the sides. In this way of placing the liner within the basket the openings at the corners thereof will be in substantial registration with adjacent spaces between the tabs. In practice the spaces between the tabs will generally be somewhat wider than the openings at the corners of the basket but this is not always essential.

The material from which the liners are made will be waterproofed in any desired manner so as to prevent absorption and retention of any exuded fruit juice in case one or more pieces of fruit become damaged even in spite of the presence of the liner.

In the use and handling of the liners of the present invention they will be cut from the web in substantially the manner described and will then be packed flat in bundles for delivery to the fruit and vegetable growers. When the fruit is to be packed the grower places a liner in each basket preferably with the waterproofed side directed inwardly, in case only one side of the liner has been treated to render it waterproof. The basket is now ready to receive the fruit or vegetables as the liner needs no securing means to hold it in place, the natural flexibility and resilience of the liner is sufficient to hold it in position while the basket is being filled with fruit. It will also be apparent that the liner will readily adapt itself to any ordinary variations in sizes of the baskets without requiring any alteration of the liner.

After the liner is in place and the basket is filled the liner effectively protects the fruit from being injured on any rough edges or projecting parts of staples and reduces losses to a minimum. It has been conservatively estimated that the fruit losses due to ordinary baskets are frequently as high as 5% while tests have shown that where the present liner is used the losses are reduced to 1% or less. The present liner is fully as effective in protecting fruit as a solid sheet of material placed around the inside of the basket. Such a solid sheet, however, would not fit in the basket, as does the present liner, unless it is cut in a curved manner to compensate for the outwardly flaring sides of the basket. With the present liner the tabs depending from the top strip very readily adapt themselves to the shape of the inside of the basket and thus permit the use of right-angularly cut blanks which eliminate waste for obvious reasons.

From the foregoing it will be clear that the present invention provides a liner which is highly effective in reducing fruit losses, extremely efficient as regards handling and assembly thereof, requires no securing means to hold it in place, requires no tools in its assembly with a container and readily adapts itself to any ordinary variations in sizes of baskets used. Thus the present liner is admirably adapted for use by unskilled labor usually employed by the fruit and vegetable grower. Furthermore the liner can be manufactured at very small cost since no material whatever is wasted, the material being cut in such a way that a maximum of protection is given to the fruit with a minimum area of material used.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

We claim:

1. The combination with a basket or similar container, of a liner therefor comprising a blank of sheet material providing a strip disposed around the inside of said basket and adjacent the top edge portion thereof, said blank of sheet material also providing spaced tabs or legs extending from said strip and having the extremities of at least a portion of the total number of tabs or legs engaging edgewise against the bottom portion of said basket so as to maintain said strip in substantially fixed relation to the top edge portion of said basket, whereby the contents of the basket are effectively protected from any roughness of the interior of the rim of said basket.

2. The combination of an open top container having a plurality of spaced ventilating openings extending substantially from the bottom to the top thereof and a liner for said container, said liner comprising a strip of sheet material disposed on the inside of said container and adjacent the top edge portions thereof and a plurality of spaced tab portions extending from one side of said strip with their ends engaging the bottom of said container, said liner being so disposed in said container that certain of the spaces between said tabs are in substantial registration with the ventilating openings of said container.

3. A liner for containers such as fruit baskets and similar receptacles having spaced ventilating openings therein, said liner comprising a strip of sheet material adapted to pass substantially around the container adjacent the upper interior portion thereof, said strip having associated therewith a plurality of spaced tabs or legs adapted to engage the bottom of the container to maintain said strip in covering relation to the upper inside surfaces of the container, said strip portion extending downwardly short of the bottom portion of said container, whereby at least some of the spaced ventilating openings of said basket may be left uncovered when the liner is placed in the basket.

4. A liner for containers formed from a blank of fibre board comprising a strip of sufficient length to pass substantially around the inside of said container adjacent the top thereof to protect the contents of the container from any roughness of the rim of the container, and a plurality of spaced tabs of substantially uniform length projecting from said strip at one side thereof, and adapted to have their extremities engage edgewise against the bottom of said container to maintain said strip in position adjacent the rim of said container, the grain of said fibre board blank running in a direction transversely to the length of said strip whereby uniform bending of said strip will be facilitated.

5. A liner for containers such as fruit baskets and similar receptacles comprising a strip of sheet material adapted to pass substantially around the container adjacent the upper interior portion thereof, said strip having associated therewith a plurality of spaced tabs or legs adapted to engage the bottom of the container to maintain said strip in covering relation to the upper inside surfaces of the container to effectively cover any roughness on such surfaces, said strip portion being of less width than the length of said tabs or legs and extending downwardly short of the bottom portion of said container.

6. The combination with a basket or similar container, of a liner therefor comprising a blank of sheet material providing a strip disposed around the inside of said basket and adjacent the top edge portion thereof, said blank of sheet material also providing spaced tabs or legs extending from said strip and lying in planes substantially parallel to the plane of the sides of the container and engaging the bottom portion thereof whereby said strip portion will be maintained in substantially fixed relation to the top edge portion of said container, to thereby protect the contents from any roughness of the inside top edge portion.

Signed at Chicago, Illinois, this 25th day of April, 1929.

CLARENCE J. GATES, Jr.
CHARLES S. NATHAN.
AMBROSE A. McDONOUGH.